United States Patent [19]

Boschung

[11] 4,203,459
[45] May 20, 1980

[54] CONTROLLING MECHANISM FOR SPRINKLER SYSTEM

[75] Inventor: Marcel Boschung, Schmitten, Switzerland

[73] Assignee: Firma Marcel Boschung, Schmitten, Switzerland

[21] Appl. No.: 870,946

[22] Filed: Jan. 20, 1978

[30] Foreign Application Priority Data

Jan. 27, 1977 [CH] Switzerland .................. 1013/77

[51] Int. Cl.² .................. F16K 11/10; F16K 31/36
[52] U.S. Cl. .................. 137/119; 137/625.5; 137/624.18
[58] Field of Search .............. 137/119, 624.14, 624.18, 137/625.5; 239/67, 68, 69, 70; 251/54, 55

[56] References Cited

U.S. PATENT DOCUMENTS

| 2,059,126 | 10/1936 | Malthaner | 137/119 |
| 2,090,246 | 8/1937 | Alexander | 251/54 |
| 2,208,682 | 7/1940 | O'Brien | 137/119 X |
| 3,243,155 | 3/1966 | Valente | 251/54 |
| 3,732,889 | 5/1973 | Conery et al. | 251/54 |
| 3,850,078 | 11/1974 | Polizzi | 137/624.14 X |

*Primary Examiner*—William R. Cline

*Attorney, Agent, or Firm*—Dann, Dorfman, Herrell and Skillman

[57] ABSTRACT

Automatic valve for controlling the passage of an in-feed pressure fluid to be delivered in predetermined quantities into one receiver. After delivery of the predetermined quantity, the flow to the one receiver is cut off and the flow is directed to the next receiver. The receivers may be sequential nozzles of a sprinkler system. The automatic control valve comprises two tandem-joined piston cylinders. The first piston cylinder comprises two cavities of different volumes. The second piston cylinder comprises only one cavity. There is placed a piston in each of the cavities of the first piston cylinder, which pistons have different diameters and the circumferential surfaces spaced from the inside walls defining the respective cavities of the first piston cylinder to afford flow of pressure fluid past the pistons. The cavity of the second piston cylinder comprises a shock-absorbing device, or dash pot connected with a common piston rod carrying also both the pistons in the cavities of the first piston cylinder. The piston in the cavity of bigger volume of the first piston cylinder is fixed to the common piston rod, whereas the piston in the cavity of smaller volume of the first piston cylinder is shiftable on the common piston rod between two limit stops.

9 Claims, 4 Drawing Figures

CONTROLLING MECHANISM FOR SPRINKLER SYSTEM

BACKGROUND OF THE INVENTION

This invention relates to an automatic valve for controlling the passage of an in-feed pressure fluid to be delivered in predetermined quantities into a receiver. When e.g. a traffic surface, cultivations or installations in a manufacturing plant have to be temporarily supplied with a predetermined quantity of liquid by means of several receivers (e.g. nozzles) at certain time intervals or in accordance with the prevailing circumstances and conditions, a liquid feed device is required the feed line of which has to be adapted to the total number of the receivers to be supplied with liquid, or each individual or several groups of receivers have to be equipped with comparatively expensive control elements, such as magnet valves, pressure air valves, control valves with time-signal transmitters or pressure pick-offs, all of which are susceptible to malfunction. When e.g. a traffic surface has to be temporarily sprinkled with water in order to cool it up during the warm season or with a liquid thaw means to prevent a glazed frost during the winter season, there are required several distribution nozzles and a correspondingly large feed device of the required quantity liquid with respectively dimensioned feed lines; all this represents respectively high investment costs. When such a feed device has to be switched on only at certain time intervals and only for a very short time, the operation of such a device is too expensive and the operating risk is too high.

There are several valves at disposal to control the delivery of the liquid mediums into a receiver, such as relieve pressure valves, shut-off valves, high-pressure valves, pilot valves or minimum pressure valves. There have been used e.g. minimum pressure valves which allow when opened the medium to flow to the receiver only at the moment when a predetermined, adjustable pressure has been reached, and which close at the moment when the pressure drops under a certain value. The piston of such a valve is loaded with a pressure coil which is adjustable to the required pressure of the medium by means of a pressure adjusting screw.

The problem as stated further on cannot, however, in any way be solved by the above-mentioned sorts of valves.

SUMMARY OF THE INVENTION

It is the primary object of the invention to propose an automatic control valve which allows an in-feed pressure liquid to flow without any special additional control means into one receiver during a predetermined time period and which automatically shuts off the liquid flow and opens the outlet opening to the next receiver, so that in this way any number of receivers can be supplied in sequence with a relatively small liquid quantity by the feed device through a delivery system the dimensions of which are much smaller than those of the known delivery system.

This object of the invention is solved by an automatic valve comprising two tandem-joined piston cylinders and a piston rod running through said piston cylinders in axial direction thereof carrying pistons placed in said piston cylinders, the first one of said piston cylinders containing two interconnected cavities having each an outlet opening, whereby each cavity is provided with a piston accommodated movably therein, said pistons having different diameters and being arranged so that their circumferential surfaces are spaced from the inside walls defining the respective cavities of said first piston cylinder, the second one of said piston cylinders containing one cavity in which a shock-absorbing device or dash pot connected with said piston rod is accommodated.

BRIEF DESCRIPTION OF THE DRAWINGS

The accompanying drawing shows for the purpose of exemplification a practical embodiment illustrating the principles of this invention, wherein.

DESCRIPTION OF THE PREFERRED EMBODIMENTS

Figure 3:
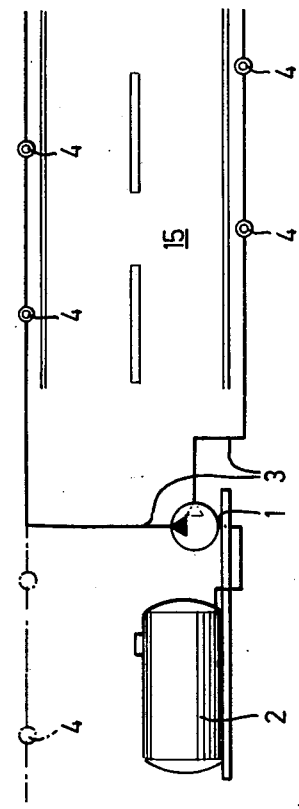
FIG. 3 is a diagrammatic view of an installation for sprinkling a street surface comprising a feed device delivery system and several control valves according to FIG. 1.

As it can be seen from FIG. 3 the surface of a traffic road 15 will be sprinkled with e.g. salt water by means of control valves 4 which are placed on both the sides of the road and which can function as receivers. A feed pump 1 delivers liquid under pressure from a tank 2 through one or several pressure lines 3 in sequence to the automatic control valves 4 (receiver) built in the pressure line 3.

Figure 1:
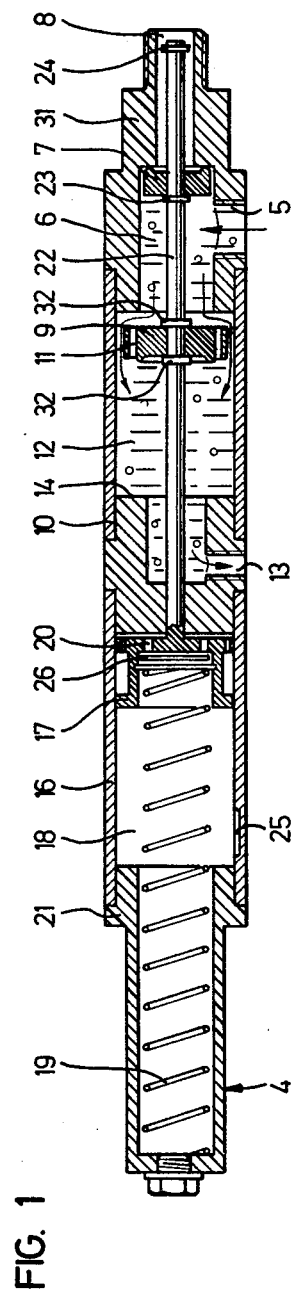
FIG. 1 is a sectional view of an automatic control valve at the initial phase, when an in-feed pressure liquid is introduced in the same.
Figure 2:
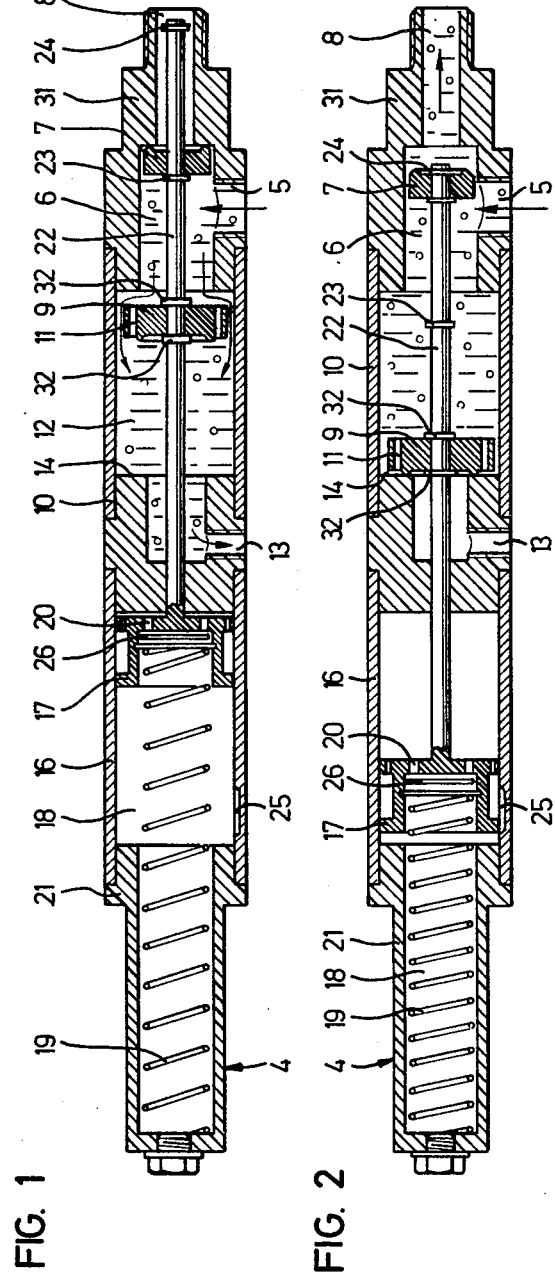
FIG. 2 is a sectional view of the valve according to FIG. 1 in a working phase, when the outlet opening to the receiver is shut off by the middle piston owing to the liquid pressure built-up in the valve.

As it can be seen from FIGS. 1 and 2 the automatic control valve 4 comprises two tandem-joined piston cylinders 10 and 16 which are closed on their outer sides by end pieces 31 and 21. Fluid is introduced at the inlet connection 5 of the first cylinder 10 into a cavity 6 of a smaller volume than that of the cavity 12 which is interconnected with the first cavity 6. There is placed a piston 7, 9 in each of the cavities 6, 12; the pistons have different diameters whereby their circumferential surfaces are spaced from the inside walls of the first cylinder 10 which define the respective cavities 6 and 12. The piston 9 placed in the cavity 12 of the bigger volume is attached to the piston rod 22 between two stop rings 32. The piston rod 22 runs in axial direction through both the cylinders 10, 16. The piston 7 placed in the cavity 6 of the smaller volume is shiftable on the piston rod 22 between two limit stops 23 and 24. In the second cylinder 16 which is water sealed from the first cylinder there is placed another piston 17 which serves as a dash pot. This piston is attached to the piston rod 22. The piston 17 will be pressed against a shock-absorbing liquid which fills the cavity 18 of the second cylinder 16 and a return spring 19 which rests with its one end on the piston 17 and with its another end on the bottom wall of the second cylinder 16 or on its end piece 21.

After the liquid has been introduced into the cylinder 10 through the inlet connection 5 a pressure will be built up in the cavity 6 acting on the one hand against the piston 7 by means of which the outlet opening 8 leading to the next control valve 4 or receiver will be closed, and on the other hand against the piston 9. The piston 9 has such a diameter that a predetermined quantity of liquid can flow between its circumferential surface and the inside wall of the cylinder 10. The spacing between the pistons 7 and 9 and the inner walls of their cavities 6 and 12 and the relative effective diameters of the pistons cause the pressure liquid in the inlet 5 to displace the piston rod 22 to its leftward limit position. The piston 7 maintains the outlet 8 closed until the rod 22 reaches the end of its leftward travel. In order to reduce its effective diameter, the piston 9 can, however, be provided with bores 11, through which the predetermined quantity of liquid can flow in the cavity 12 of the bigger volume and farther on through the outlet opening 13 to the receiver location. The piston 9 starts moving in direction of the limit stop by the liquid pressure built up in the cavity 6 or the cavity 12. In order to return and timely determine this movement, the piston 9 presses via the piston rod 22 on the piston 17 which is placed in the second cylinder 16. The piston 17 will be put in motion against the action of the shock-absorbing liquid and of the return spring 19. The shock-absorbing liquid flows through one or several bores 20 provided in the piston 17 into the cylinder cavity in front of the piston 17 (seen in direction from the first cylinder 10), so that the piston 17 is slowly moved toward and against the end piece 21 of the cylinder.

When the pistons 9 and 17 are moved, the piston rod 22 is simultaneously moved. During such a movement the piston 7 placed in the cavity 6 of the smaller volume is taken along by the limit stop 24. When the piston 9 approaches the limit stop 14, the piston 7 is moved away from the outlet opening 8. In this way the outlet opening 8 will be opened. In this phase the piston 9 which arrives at the stop 14 closes the outlet opening 13 leading to the stand of the receiver and the liquid flows to another control valve or receiver through the outlet opening 8, where the same procedure described above is repeated. There can be connected to the outlet opening 8 either another control valve 4 or a receiver.

When finally the flow of liquid is interrupted either by hand or by an automatic switch device and the pressure in the pressure line 3 is reduced, the return spring 19 will be active and pushes the piston 17 in the cavity 18 of the second cylinder 16 along with the piston rod 22 and the piston 9 into their starting positions. Before this phase is completed the piston 7 is equally taken along by the limit stop 23 to its starting position, so that the outlet opening 8 will be closed again.

In order to accelerate the opening of the piston 17 in the last phase of motion of the pistons 9 and 17, the inside diameter of the second cylinder 16 and accordingly the volume of the cavity 18 are enlarged at the end of the path of motion of the piston 17 by a groove 25 slotted in the inside wall of the cylinder 16. In this way the shock-absorbing liquid can pass much faster along the piston 17 into the space lying in front of the piston 17. In this way the piston 7 can be further quickly opened without allowing pressure to be built up or equilized in the cavities 6 and 12.

Equally, the return of the pistons 9 and 17 and so the closing of the piston 7 can be accelerated when the piston 17 is provided with a throttle 26. The shock-absorbing liquid presses the throttle plate 26 against the piston 17 in the opening phase so that the bores 20 are largely sealed. When the piston 17 is returned by means of the return spring 19, the shock-absorbing liquid presses against the throttle plate 26 through the bores 20 and eases and accelerates in this way the return of the liquid.

Figure 4:
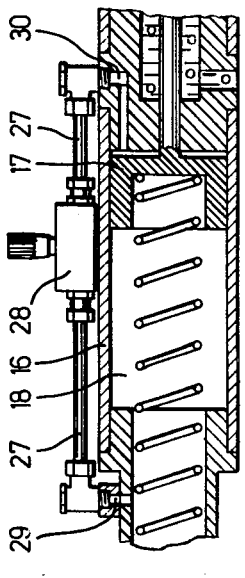
FIG. 4 is a partial sectional view of a modified form of the valve according to FIG. 1 with a return line connected to the cavity of the second cylinder.

The control of the flow of the liquid and so the velocity of the motion of the piston 17 at a given pressure can be carried out by means of an external return line 27 with a flow control valve 28 instead of by means of the bores 20 and the throttle plate 26 (see FIG. 4). In this case the piston 17 presses back the shock-absorbing liquid through the outlet opening 29 and the return line 27 via the flow control valve 28 and through a reentry opening 30 into the cylinder 16, i.e. in front of the piston 17 (seen from the first cylinder 10). The flow quantity of the liquid can be controlled by the flow control valve 28 built in the return line 27. The acceleration of the return motion of the pistons 9 and 17 can be achieved in this case also in such a way that a flow control valve will be used which throttles the flow only in one direction and allows a full flow of a liquid in the other direction.

Owing to the above-described automatic control valve it is possible to successively and sequentially deliver liquid to several receivers by means of a delivery installation having a small delivery capacity and pressure lines of small dimensions. According to the choice of the feed device or according to the consumption of the total installation two or more independent pressure line systems can naturally be connected at the same time to a delivery pump so that the same procedure can simultaneously take place on several locations. The opening time of the receivers can be predetermined by different measures when the time period during which the outlet opening 13 has to remain open, or the required quantity of liquid for the receiver are known. Thereby the quantity of liquid flowing past the piston 9 along the inside wall of the cylinder 10 or through the bores 11 plays a decisive role. Besides, the consumption time can be determined by the in-feed pressure of liquid at the inlet connection 5 and finally by the choice of the diameter of the piston 17.

What is claimed is:

1. In a sprinkler system a mechanism for controlling the passage of predetermined quantities of pressure liquid from a supply comprising a body having a first cylinder and a second cylinder joined coaxially together, a common piston rod running through both cylinders in the axial direction thereof, said piston rod having a piston in each cylinder mounted rigidly on said rod for axial displacement in its associated cylinder with axial displacement of said rod between opposite first and second limit positions, and a second piston mounted on said rod in the first one of said cylinders, the pistons in said first cylinder being valving pistons, the first one of said cylinders comprising an inside wall defining at least one cavity having first and second outlet openings for liquid on opposite sides of the valving pistons, and one inlet opening between said outlet openings and connected to said supply, the first outlet opening being positioned to be engaged and closed by said rigidly-mounted valving piston when said rod is in said first limit position, and the second opening being positioned to be engaged and closed by said second valving piston when said rod is in said second limit position, the second valving piston engaging said second outlet opening to maintain it closed during a predetermined axial displacement of said rod away from said second limit position toward said first limit position and disengaging said second outlet opening to open it when said rod moves into said first limit position to engage said first valving piston with said first opening after said predetermined displacement, circumferential surfaces of both said valving pistons being spaced from said inside wall to afford limited flow of pressure liquid past one of said valving pistons in the cavity toward the open outlet opening, the spacing of the circumferential surfaces from the inside wall and the diameters of said valving pistons providing a greater pressure liquid force on said first valving piston than on said second valving piston whereby the pressure of said supply liquid in said inlet displaces said rod to its first limit position, the second cylinder comprising a dash pot having a cavity, the rigidly-mounted piston in said second cylinder comprising a dash-pot piston secured to said common piston rod for axial travel in said cavity, and means to regulate the rate of travel of said piston in said cavity, and thereby the axial displacement of said two valving pistons.

2. Controlling mechanism according to claim 1, characterized in that said first cylinder comprises two cavities of different diameter, said two valving pistons being in said two cavities respectively, each piston having a diameter slightly less than its associated cavity diameter, the piston of a bigger diameter being accommodated in the cavity of the bigger volume and being rigidly attached to said common piston rod, the piston of a smaller diameter being accommodated in the cavity of the smaller volume and slidably arranged on said common piston rod, said rod having two limit stops limiting sliding movement of said smaller piston thereon.

3. Controlling mechanism according to claim 2, characterized in that the valving piston of bigger diameter is movable toward said first outlet opening by the liquid pressure of said inlet opening against the action of the dash pot and is positioned at the limit position of said rod in that direction to engage and close said first outlet opening.

4. Controlling mechanism according to claim 2 characterized in that the smaller piston is displaced by one of the limit stops in a direction towards the second outlet opening and operates at the limit position of said rod in that direction to close said second outlet opening.

5. Controlling mechanism according to claim 1, characterized in that said dash pot includes a return spring which rests with its one end on the dash pot piston and with its other end on an end wall to bias said rod toward its second limit position and away from its first limit position, and a shock-absorbing liquid which fills the cavity of said second cylinder.

6. Controlling mechanism according to claim 1, characterized in that the valving piston rigidly attached to said common piston rod in the first cylinder and the dash pot piston rigidly attached to said common piston rod in the second cylinder are provided with bores running axially of said common piston rod.

7. Controlling mechanism according to claim 6, characterized in that the dash pot piston in said second cylinder is provided with a throttle plate restricting the flow through the bores therein when the rod moves toward its first limit position, and eases the flow through the bores when the rod moves toward its second limit position.

8. Controlling mechanism according to claim 1, wherein said regulating means of the cavity of said second cylinder includes an enlargement at one end of the dash pot cavity to register with the dash pot piston when said piston rod is adjacent its first limit position to accelerate the rate of travel of said dash pot piston.

9. Controlling mechanism according to claim 1, characterized in that the cavity of said second cylinder has an external return line having inlet and outlet openings with a flow control valve therebetween, said inlet and outlet openings of said return line being positioned at the opposite ends of said cavity, and the dash pot piston being movable between said return line openings.

* * * * *